US006442388B1

United States Patent
Lopez et al.

(10) Patent No.: US 6,442,388 B1
(45) Date of Patent: Aug. 27, 2002

(54) METHOD FOR CONDUCTING HANDOFF BACK COMMUNICATION SCENARIOS

(75) Inventors: Cesar Garcia Lopez, Saltillo; Elsa Delgado, Ramos Arispe, both of (MX)

(73) Assignee: Telefonaktiebolaget LM Ericsson, (publ) (SE)

(*) Notice: Subject to any disclaimer, the term of this patent is extended or adjusted under 35 U.S.C. 154(b) by 0 days.

(21) Appl. No.: 09/464,124

(22) Filed: Dec. 16, 1999

Related U.S. Application Data
(60) Provisional application No. 60/133,992, filed on May 13, 1999.

(51) Int. Cl.[7] .................................................. H04Q 7/20
(52) U.S. Cl. ...................... 455/436; 455/439; 455/445; 455/560
(58) Field of Search ................................ 455/422, 432, 455/433, 438, 439, 444, 445, 560, 561

(56) References Cited

U.S. PATENT DOCUMENTS

| | | | |
|---|---|---|---|
| 4,398,063 A | | 8/1983 | Hass et al. ................. 179/2 EB |
| 5,018,187 A | | 5/1991 | Marinho et al. .............. 379/60 |
| 5,444,773 A | | 8/1995 | Hirsohn et al. ............. 379/219 |
| 5,548,533 A | * | 8/1996 | Gao et al. .................... 455/445 |
| 5,577,029 A | * | 11/1996 | Lu et al. ...................... 455/445 |
| 6,230,013 B1 | * | 5/2001 | Wallentin et al. ........... 455/436 |
| 6,349,208 B1 | * | 2/2002 | Sexton et al. ............... 455/439 |

FOREIGN PATENT DOCUMENTS

WO  WO 98/06226  12/1998
WO  WO 98/10596  12/1998

OTHER PUBLICATIONS

ANSI–41 Standard Telecommunications Industry Association Doc. No. 41.2–D, Jan. 31, 2000, Cellular Radiotelecommunications Intersystem Operations: Intersystem Handoff Information Flows.

* cited by examiner

*Primary Examiner*—Nay Maung
(74) *Attorney, Agent, or Firm*—Jenkens & Gilchrist (57) ABSTRACT

A method which supports Mobile Station (MS) handoff back operations across tandem switches makes use of a modification to the ANSI-41 Standard. The method includes the steps of determining that a handoff back call connection operation to a Target Mobile Switching Center (involved in the call path and not directly connected to the Serving Mobile Switching Center) should occur, verifying that a designated channel of the Target Mobile Switching Center (Target MSC), which may be an Anchor MSC (AMSC) or Tandem MSC (except an MSC directly connected to the Serving MSC) is available to support the MS, establishing a third inter-MSC trunk between the Serving MSC and the Target MSC, moving the MS to the designated channel, and directing a tandem MSC, the Target MSC, and the SMSC to release unused inter-MSC trunks. The method operates within a telecommunications network, including an MS served by a Serving MSC connected along a call path to one or more Tandem MSCs and the AMSC (which can also be the TMSC, but not an MSC directly connected to the SMSC), and which is connected in series with the Tandem MSCs by one or more inter-MSC trunks.

11 Claims, 6 Drawing Sheets

METHOD FOR CONDUCTING HANDOFF BACK COMMUNICATION SCENARIOS

CROSS REFERENCE TO RELATED APPLICATIONS

This application claims the benefit under Title 35 United States Code §119(e) of U.S. Provisional Application No. 60/133,992, filed on May 13, 1999, which is incorporated herein by reference in its entirety.

BACKGROUND OF THE INVENTION

1. Technical Field

This invention relates generally to mobile cellular telecommunications, and more particularly, to a method of utilizing existing signaling protocols, such as the American National Standards Institute (ANSI)-41 protocol, to implement more efficient handoff back operations.

2. History of Related Art

Within a telecommunications network that supports Mobile Station (MS) roaming, several methods have been devised to transfer communications for active call connections maintained by any one MS as it moves away from one serving switch toward another. The American National Standards Institute (ANSI)-41 D Standard includes several procedures and messages to implement such inter-system (inter-exchange) handoff forward operations (i.e., transferring the active call connection of a MS from the serving switch to a target switch which is not currently trunk-connected in the call), and handoff back operations (i.e., transferring the active call connection from the serving switch to a target switch which is already trunk-connected within the call path). While several scenarios are offered for handling handoff forward operations with a tandem switch, only two scenarios are available when a handoff back operation must be accomplished. Further, the handoff back call connection operation is only valid for use when the target switch is connected directly to the serving switch (i.e., there is a direct trunk connection therebetween). Thus, for example, the handoff back message cannot be used to transfer a call connection from a serving Mobile Switching Center (MSC) to an anchor MSC using the anchor MSC as the target switch If there is a tandem MSC located along the call path between the anchor MSC and the serving MSC.

While it is possible to invoke the handoff back operation under such circumstances (i.e., where multiple switches are trunk-connected along a call path, and the target switch is not immediately trunk-connectable to the serving switch), the result will be that trunks between the various switches (connected before handoff) will not be released after the handoff operation occurs. Thus, network resources are wasted.

Another problem occurs when a HandoffToThird message is received by a tandem or anchor switch which does not support a handoff operation with path minimization. The result is a RETURN ERROR or REJECT response sent back to the requesting switch. Alternatively, no response at all may be received by the requesting switch. When this occurs, the serving switch must send a FacilitiesDirective message back along the call path, past the tandem switch, so that the handoff can occur. However, once again, previously connected trunks along the call path will not be released, and network resources will be wasted.

These scenarios are illustrated in FIGS. 1, 2, 3, and 4. A successful sequence of handoff operations in the prior art can be seen in the network signaling and nodal operation diagram of FIG. 1. In this case, a successful handoff back with tandem using the HandoffToThird message and path minimization are shown within a telecommunications network 15 including a telephone 40, an anchor MSC 60, a tandem1 MSC 70, a serving MSC 90, and a MS 50 are shown. There is an active call connection between the telephone 40 and MS 50, using switches 60, 70, and 90, which are connected by trunks 120 and 130. The telephone 40 (which may be a wireline telephone or another MS) is connected to the switches 60, 70, and 90 by way of a residential line connection or wireless network interface 110, and the MS 50 is connected to the serving MSC using a wireless network interface 140.

Figure 1:
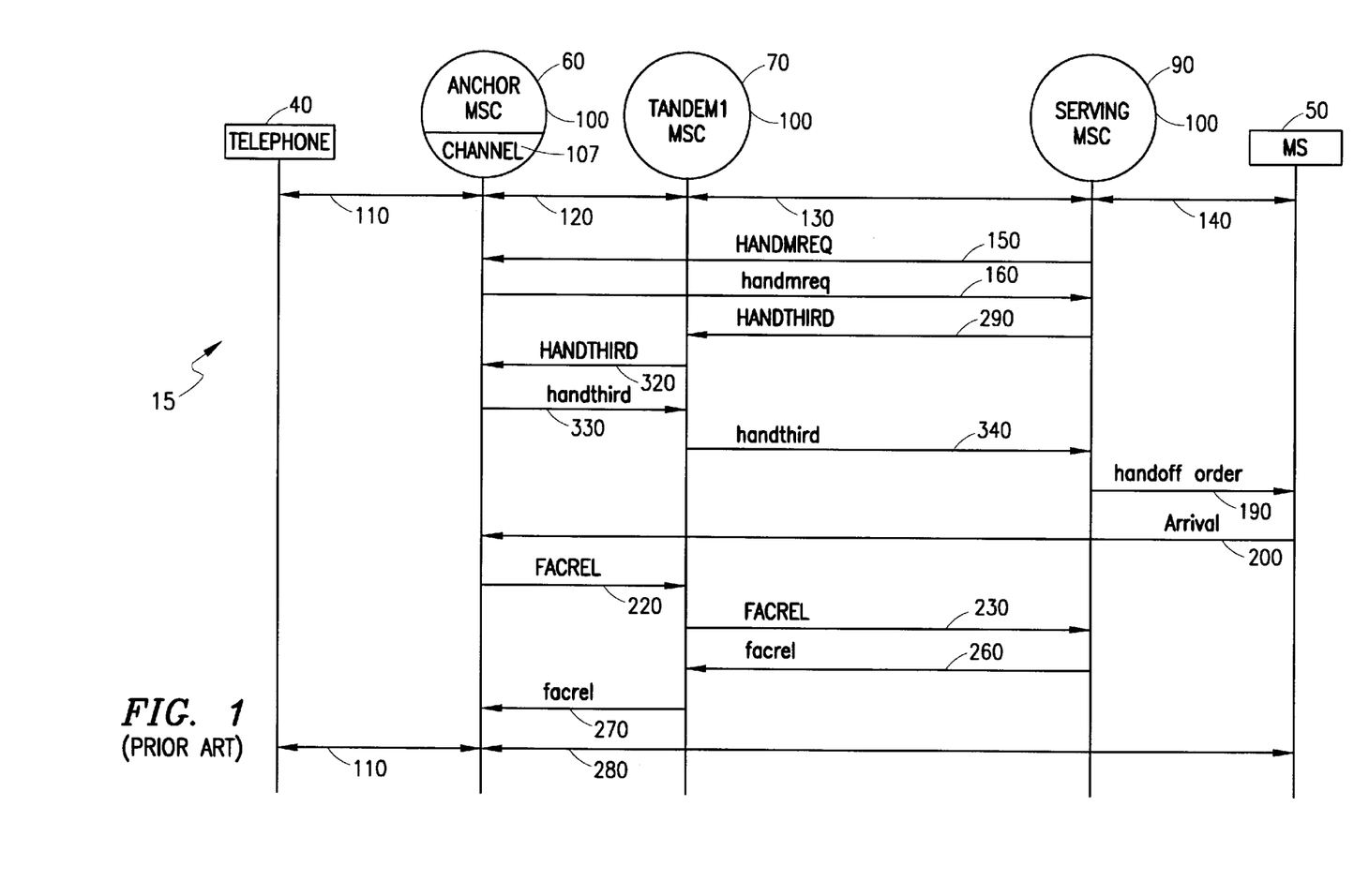
FIG. 1 (previously described) is a network signaling and nodal operation diagram illustrating prior art handoff operations as used in a network that supports path minimization.

If the serving MSC 90 operates to determine that a handoff operation to a nearby candidate MSC, such as the anchor MSC 60, is appropriate, the serving MSC 90 may send a HandoffMeasurementRequest message 150 to the anchor MSC 60. In response, the candidate MSC 60 performs location measurements according to its internal programming algorithms, and returns the results to the serving MSC 90 in the form of a HandoffMeasurementRequest response 160. Based on the response 160 content, the serving MSC 90 determines that the call should be handed off to the anchor MSC 60, which is now also considered the target MSC 60. The anchor MSC 60 will be directed to receive the MS 50 using the handoff back call connection with path minimization operation, and the MS 50 will be moved to the designated channel 107 of the anchor MSC 60. Directing the anchor MSC 60 to receive the MS 50 involves sending a HandoffToThird message 290 from the serving MSC 90 to the tandem1 MSC 70, which in turn directs the tandem1 MSG 70 to perform an intersystem handoff task with path minimization; sending a HandoffToThird message 320 from the tandem1 MSC 70 to the anchor MSC 60, which results in directing the anchor MSC 60 to perform task minimization and verifies that the designated channel 107 of the anchor MSC 60 is available to support the MS 50; and sending a HandoffToThird response along the call path from the anchor MSC 60 to the serving MSC 90 (steps 330 and 340).

Moving the MS 50 to the designated channel 107 of the anchor MSC 60 requires sending a Mobile Handoff Order 190 from the serving MSC 90 to the MS 50 and receiving the MS 50 on the designated channel 107 at arrival step 200.

Directing the tandem1 MSC 70 and serving MSC 90 to release the first and second inter-MSC trunks 120 and 130, and marking the first and second inter-MSC trunks 120 and 130 as idle requires sending a FacilitiesRelease message along the call path from the anchor MSC 60 to the serving MSC 90 (i.e., steps 220 and 230), sending a FacilitiesRelease response 260 along the call path from the serving MSC 90 to the tandem1 MSC 70, and sending a FacilitiesRelease response 270 along the call path from the tandem1 MSC 70 to the anchor MSC 60. At this point, the call path includes only the telephone line or wireless network interface 110, the anchor. MSC 60, and the wireless network interface 280 between the telephone 40 and the MS 50. No unused inter-MSC trunks 120, 130 are left connected, and network resources are conserved.

Figure 2:
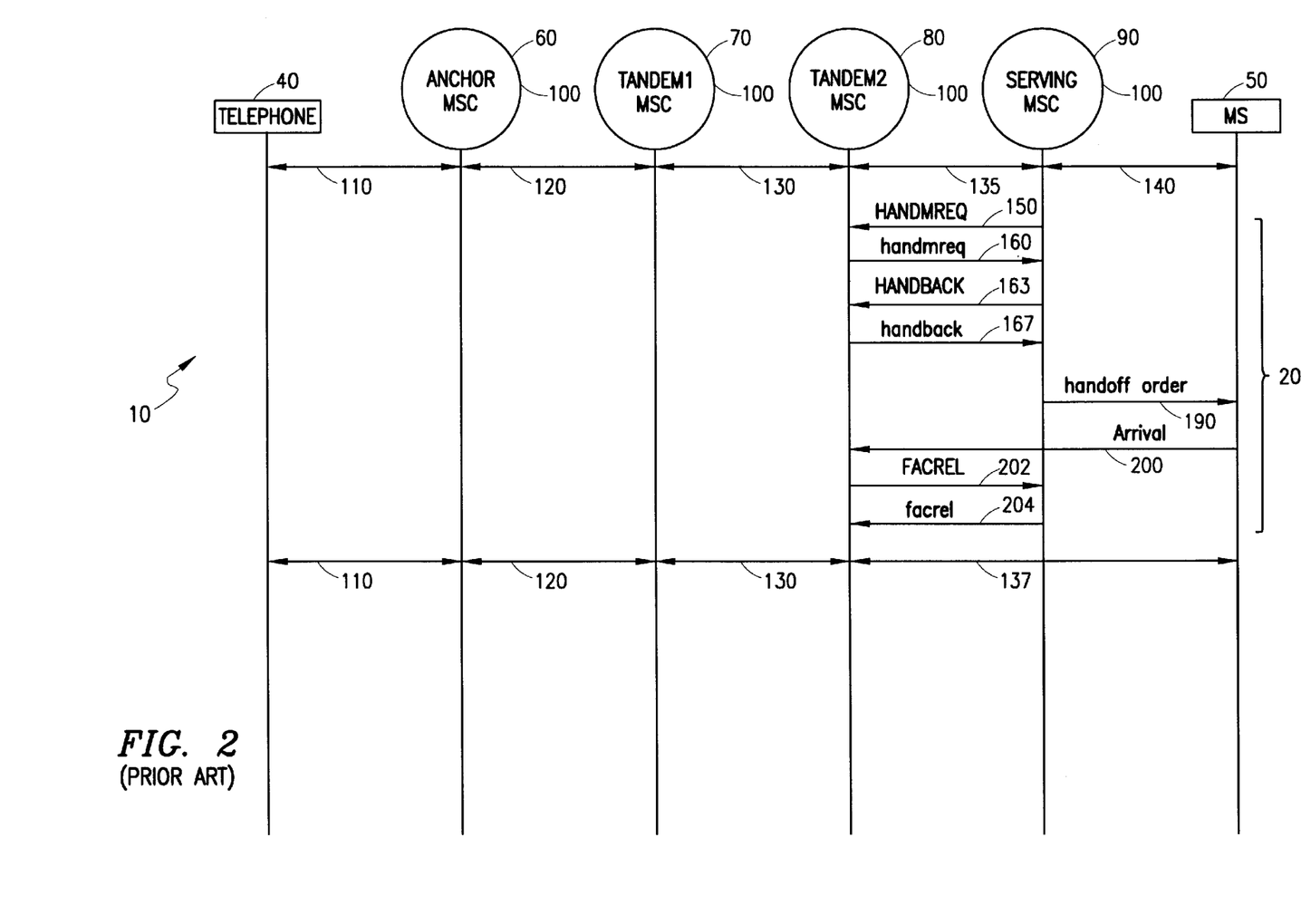
FIG. 2 (previously described) is a network signaling and nodal operation diagram illustrating prior art handoff back operations.

FIG. 2 is a network signaling and nodal operation diagram illustrating prior art handoff back operations, wherein the telecommunications network 10 includes a telephone 40, an anchor MSC 60, a tandem1 MSC 70, tandem2 MSC 80, serving MSC 90, and a MS 50. There is an active call connection between the telephone 40 and MS 50, using a series of switches 100, which are connected by trunks 120, 130, and 135. The telephone 40 (which may be a wireline telephone or another MS) is connected to the switches by way of a residential line connection or wireless network interface 110 and the MS 50 is connected to the serving MSC using a wireless network interface 140.

If the serving MSC 90 operates to determine whether a handoff operation to an adjacent candidate MSC, such as the tandem2 MSC 80, is appropriate, the serving MSC 90 may send a HandoffMeasurementRequest message 150 to the tandem2 MSC 80. In response, the candidate MSC 80 performs location measurements according to its internal programming algorithms, and returns the results to the serving MSC 90 in the form of a HandoffMeasurementRequest response 160. Based on the response 160 content, the serving MSC 90 determines that the call should be handed off to the tandem2 MSC 80, which is now also considered the target MSC 80. Further, the serving MSC 90 has determined that the tandem2 MSC 80 is already trunk-connected along the call path.

At this point, a HandoffBack message 163 is sent from the serving MSC 90 to the target MSC 80, which directs the target MSC 80 to initiate a handoff back task. If a voice channel on the target MSC 80 is available, a HandoffBack response 167 is returned to the serving MSC 90, which allows the handoff operation to proceed.

The serving MSC 90, upon receipt of the HandoffBack response 167, sends a Handoff Order message 190 to the served MS 50. This action directs the MS 50 to move to the available voice channel on the target MSC 80. Upon arrival 200 of the MS 50 on the voice channel of the target MSC 80, a FacilitiesRelease message 202 is sent from the target MSC 80 to the serving MSC 90. This indicates that the handoff operation has been successful and that the facilities used by the serving MSC 90 are no longer needed. The serving MSC 90, in turn, sends a FacilitiesRelease response 204 to the target MSC 80, releasing the trunk connection 135 and marking the inter-MSC trunk 135 as idle. The target MSC 80, in turn, marks the inter-MSC trunk 135 as idle and the handoff back process is complete. The resulting call connection between the telephone 40 and the MS 50 comprises the series of switches 100 connected by trunks 120 and 130. The telephone 40 is connected to the switches 100 by way of line connection or wireless interface 110, and the MS 50 is connected to the new serving MSC 80 using the wireless network interface 137.

The scenario 20 just described, is a classic prior art handoff back operation from a serving switch 100 to a tandem switch 100, where the tandem switch 100 is trunk-connected to the serving switch 100 along the call path. In this case, no network resources are wasted, and the ANSI-41 protocol operation functions in an efficient manner.

Figure 3:
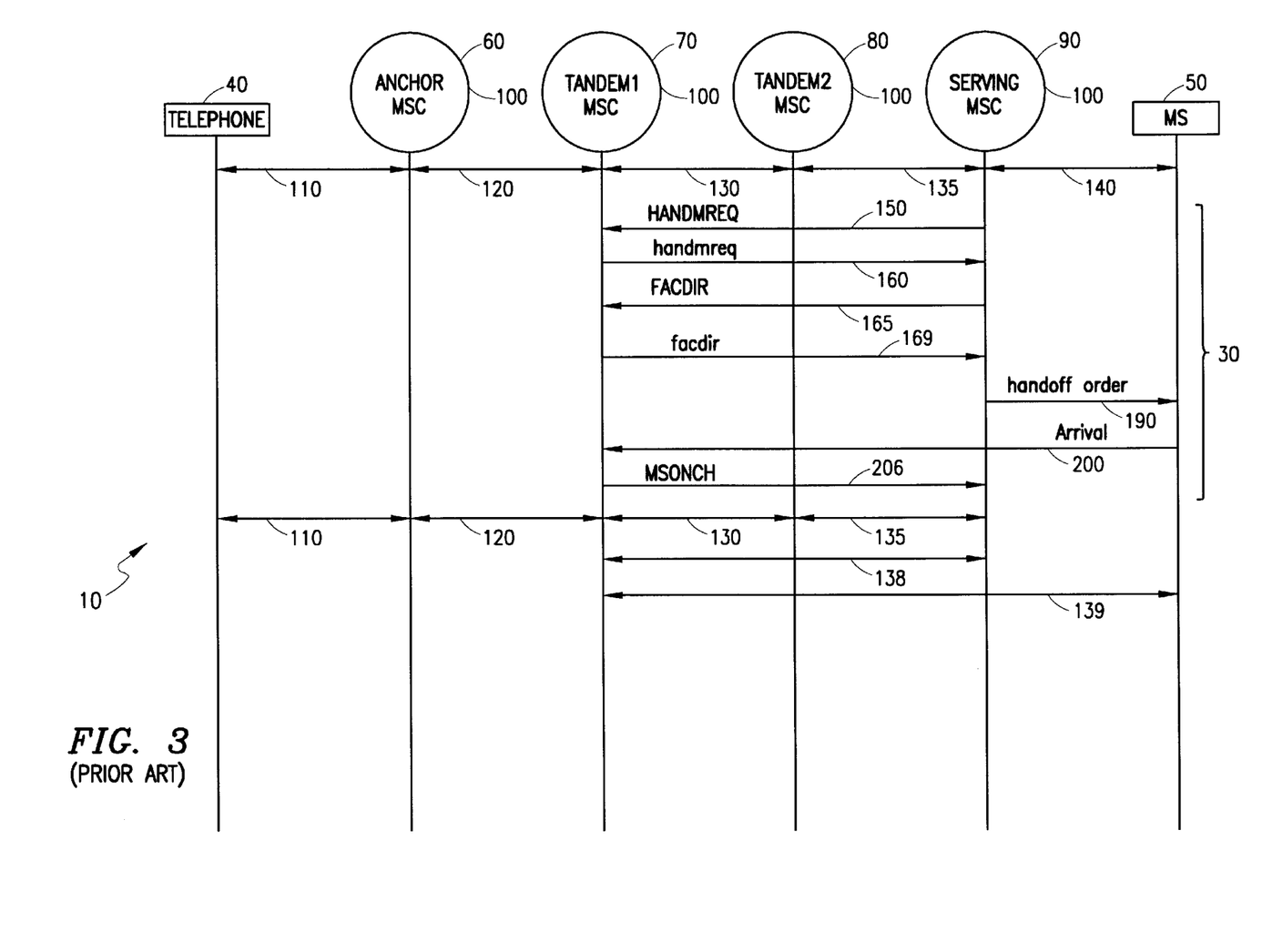
FIG. 3 (previously described) is a network signaling and nodal operation diagram illustrating prior art handoff back operations without path minimization.

Turning now to scenario 30 of FIG. 3, the prior art handoff back operation to a tandem switch 100 (i.e., tandem1 MSC 70), which is in the call path, but is not trunk-connected to the serving MSG 90 and path minimization is not supported, is illustrated. In this case, as will be described, a handoff back operation results in wasted network resources.

As noted above, an active call connection between the telephone 40 and the Mobile Station 50 exists, making use of trunk connections 120, 130, and 135. A HandoffMeasurementRequest message 150 is sent from the serving MSC 90 to the tandem1 MSC 70. The HandoffMeasurementRequest response 160 is returned to the serving MSC 90, where it is determined that a handoff back operation from the serving MSC 90 to the tandem1 MSC 70 is desirable.

A FacilitiesDirective message 165 is then sent from the serving MSC 90 to the tandem1 MSC 70, which results in a FacilitiesDirective response 169 from the tandem1 MSC 70 to the serving MSC 90. The Handoff Order 190 is sent to MS 50, and the MS 50 arrives 200 on the available channel of the tandem1 MSC 70. The tandem1 MSC 70 sends a Mobile Station On Channel message 206 to the initiator of the handoff back task (i.e., the serving MSC 90), informing the serving MSC 90 that the tandem1 MSC 70 has completed the handoff back task. Unfortunately, at this point, all of the trunks 120, 130, and 135 are still connected. Moreover, a new trunk 138, has also been connected between the tandem1 MSC 70 and the serving MSC 90. The resulting call connection between the telephone 40 and the MS 50 comprises the series of switches 100 connected by trunks 120, 130, 135, and 138. The telephone 40 is connected to the switches 100 by way of line connection or wireless interface 110, and the MS 50 is connected to the new serving MSC 70 using the wireless network interface 139. Network resources are wasted in this case, because the most efficient connection between the telephone 40 and the MS 50 should require only the trunk connection 120, such that the network resources tandem2 MSC 80, serving MSC 90, and trunks 130, 135, and 138 can be released.

Figure 4:
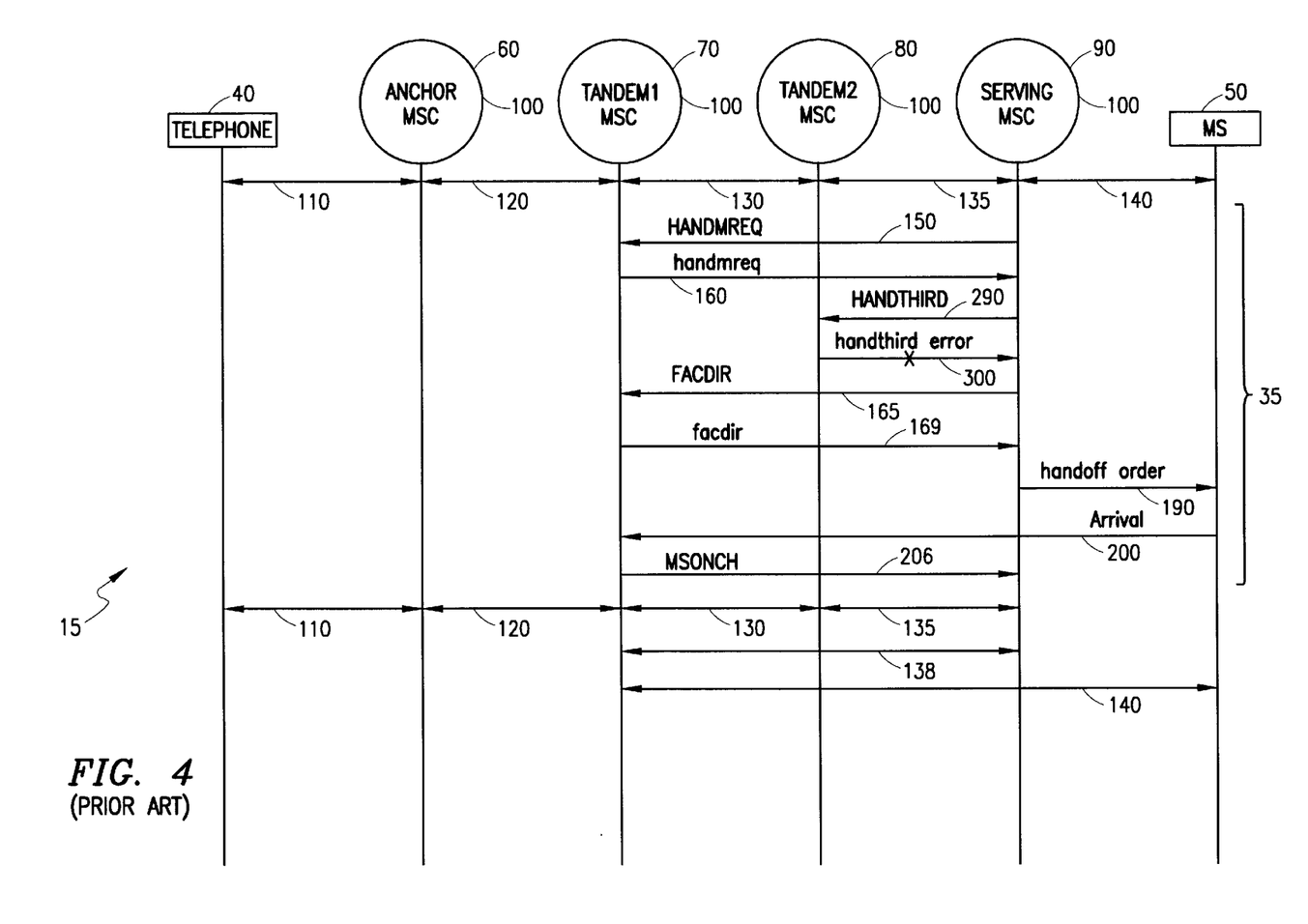
FIG. 4 (previously described) is a network signaling and nodal operation diagram illustrating prior art handoff back operations with path minimization.

Referring now to FIG. 4, scenario 35 illustrates what can happen in prior art communications when a HandoffToThird message is sent to a switch which is incapable of accepting the message for execution. The same result may occur if no response is received to the message due to congestion within the network 15, or for other reasons recognized by those skilled in the art.

In this case, a HandoffMeasurementRequest message 150 is sent from the serving MSC 90 to the tandem1 MSC 70 (the desired target switch 100), which elicits a HandoffMeasurementRequest response 160 from the tandem1 MSC 70 to the serving MSC 90. The serving MSC 90, in turn, sends a HandoffToThird message 290 to the tandem2 MSC 80, which is incapable of processing the message 290. As noted above, there may be no response because the tandem2 MSC 80 does not support the HandoffToThird command, or possibly, because the network 15 is congested. In any event, an error 300 occurs, and the serving MSC 90 receives a response such as RETURN ERROR, REJECT, or NO RESPONSE (i.e., no response at all is received).

Since the tandem2 MSC 80 is incapable of supporting a handoff operation with path minimization (as evidenced by the error message), a FacilitiesDirective message 165 is instead sent from the serving MSC 90 to the tandem1 MSC 70, or target MSC 70. Once the tandem1 MSC 70 verifies that a designated channel is available for use by the MS 50, a FacilitiesDirective response 169 is sent from the tandem1 MSC 70 to the serving MSC 90. This results in a Handoff Order message 190 being sent from the serving MSC 90 to the MS 50 directing movement of the MS 50 onto the designated channel at the tandem1 MSC 70. After arrival 200 of the MS 50 on the designated channel at the tandem1 MSC 70, the tandem1 MSC 70 will send a Mobile Station On Channel message 206 to the serving MSC 90. Once again, the problem of excessive trunks remaining in use exists. In this case, the original trunks 120, 130, and 135 are still connected, with the additional trunk 138 also having been established as a result of the handoff operation. Network resources in this situation are wasted in this case because the most efficient connection between the telephone 40 and the MS 50 should require only the trunk connection 120, such that the network resources tandem2 MSC 80, serving MSC 90, and trunks 130, 135, and 138 can be released.

Therefore, what is needed is a method to support a handoff back call connection operation within a telecommunications network, including multiple, connected switches, that enables the release of unused trunks along the call path when the target switch is already active within the call path, and not directly connected to the serving switch. Such a method should be usable within the current ANSI-41 D Standard, and also be backward-compatible with previous versions of the standard. Such a method should require no changes in currently-available network switch hardware.

SUMMARY OF THE INVENTION

The method of the present invention operates to enable handoff back operations within a telecommunications network during two different call connection scenarios. First, when path minimization is not possible, and the handoff occurs between a serving switch and a target switch, wherein the target switch is already connected as an anchor or a tandem within the call path, and not directly trunk-connected to the serving switch. Second, where the call path is the same as in the first scenario, and path minimization may be possible, but it is determined that one of the switches in the call path does not support path minimization operations. In each case, the target MSC is a switch in the call path that has no direct trunk connection to the switch currently serving the MS, which is the circumstance leading to inefficiencies and wasted resources using current ANSI-41 D handoff back operations.

When path minimization is not supported among the switches of the active call path, the method supporting mobile station handoff back call connection operations within a telecommunications network includes the steps of determining that a handoff back call connection operation to a target MSC should occur, verifying that a designated channel on the target MSC is available to support the Mobile Station, moving the Mobile Station to the designated channel of the target MSC, directing the switches along the call path that are no longer needed to release any unnecessary inter-MSC trunks, and marking the released inter-MSC trunks as idle.

If path minimization operations may be possible, but are found to not be supported by at least one switch within the call path, the method supporting mobile station handoff back call connection operations within a telecommunications network comprises the steps of determining that a handoff back call connection operation to a target MSC should occur, determining that the target MSC will not support path minimization operations, verifying that a designated channel on the target MSC is available to support the Mobile Station, moving the Mobile Station to the designated channel of the target MSC, directing the switches along the call path that are no longer needed to release any unnecessary inter-MSC trunks, and marking the released inter-MSC trunks as idle. The step of determining that the target MSC (or any tandem along the call path) will not support a path minimization operation may be accomplished by sending a HandoffToThird message from the serving MSC to the MSC which will not support path minimization (i.e., a non-capable MSC), which directs the non-capable MSC to perform path minimization, and receiving a response from the non-capable MSC at the serving MSC, which is a RETURN ERROR, REJECT, or NO RESPONSE (meaning that no response at all is received within the timeout period of the service MSC or switch message reception timer).

DETAILED DESCRIPTION OF PRESENTLY PREFERRED EXEMPLARY EMBODIMENTS

The method of the present invention is adaptable to at least two different inter-system (inter-exchange) handoff scenarios. The first is a handoff back with tandem via the FacilitiesDirective message, where path minimization is not supported. The second is a handoff back with tandem via the FacilitiesDirective message when HandoffToThird messaging with tandem and path minimization is attempted, but fails.

Figure 5:
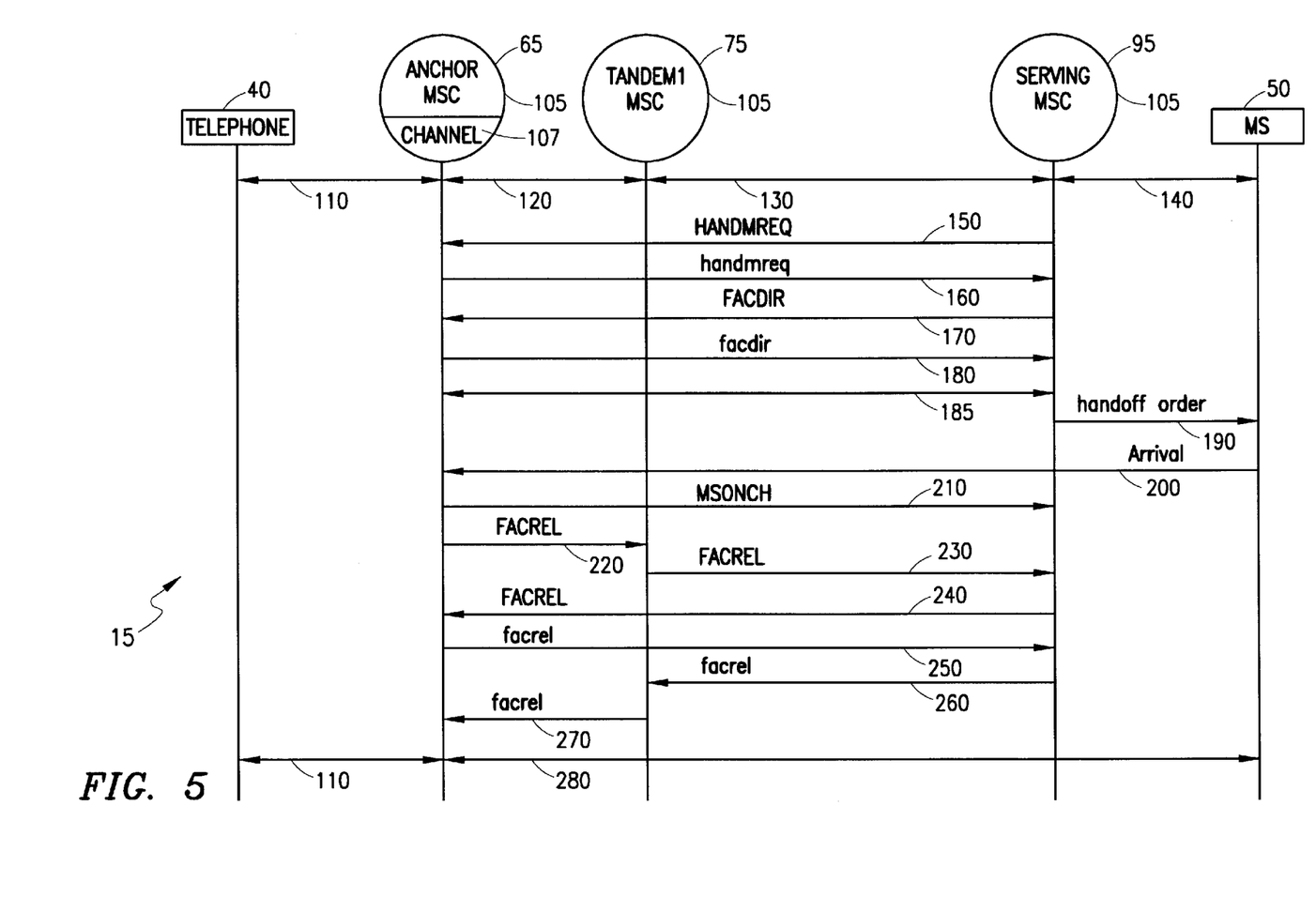
FIG. 5 is a network signaling and nodal operation diagram illustrating the method of the present invention for handoff back operations where no path minimization is possible.

Turning now to FIG. 5, the network signaling and nodal operation diagram illustrating the first method of the present invention can be seen. Generally, there is a telecommunications network 15 comprising several switches 105 connected along a call path between a telephone 40 and a Mobile Station 50. For example, the switches 105 may comprise an anchor MSC 65 connected to a tandem1 MSC 75 by a trunk 120, which is, in turn, connected to a serving MSC 95 by a trunk 130. The telephone 40 (which may be a wireline phone, mobile phone, or other telephonic communication device) is connected by a telephone line 110 (or wireless network interface, etc. as appropriate for the type of device 40) to the anchor MSC 65, and the Mobile Station 50 is connected by a wireless network interface 140 to the serving MSC 95. It should be noted that in every instance where a HandoffBackMessage, a HandoffMeasurementRequest message, a HandoffToThird message, or a FacilitiesDirective message are used, the HandoffBack2, HandoffMeasurementRequest2 message, HandoffToThird2 message, and FacilitiesDirective2 messages may be substituted. This accommodates data service transmissions, which are only supported by the HandoffBack2, HandoffMeasurementRequest2, HandoffToThird2, and FacilitiesDirective2 messages.

The first embodiment of the invention involves a method supporting a handoff back call connection operation within a telecommunications network via the FacilitiesDirective process when more than two switches are involved, and the handoff is to a switch (anchor or tandem MSC) that has no direct trunk connection to the currently-serving switch, but path minimization is not supported. In this exemplary case, the anchor MSC performs the handoff back function.

The telecommunications network 15 includes a MS 50 served by a Serving Mobile Switching Center (SMSC) 95, using a wireless network interface 140, connected along the call path to a tandem MSC (TMSC) 75 and an anchor MSC 65. The anchor MSC 65 is connected to the TMSC 75 by a first inter-MSC trunk 120, and the TMSC 75 is connected to the SMSC 95 by a second inter-MSC trunk 130. The anchor MSC 65 includes a designated available channel 107. The handoff back call connection operation occurs from the SMSC 95 to a switch without a direct trunk connection to the serving SMSC 95 (e.g., the anchor MSC 65).

The method includes the step of determining that a handoff back call connection operation to a target MSC should occur. The target MSC is the anchor MSC 65 in this case. The next step is verifying that the designated channel 107 of the anchor MSC 65 is available to support the MS 50. Next, the method involves establishing an inter-MSC trunk 185 between the anchor MSC 65 and the serving MSC 95, and moving the MS 50 to the designated channel 107 of the anchor MSC 65. The method includes the step of directing the tandem1 MSC 75 and the serving MSC 95 to release the first, second, and third inter-MSC trunks 120, 130, and 185, respectively. Finally, the method may include the step of marking the first, second, and third inter-MSC trunks 120, 130, and 185 as idle.

The step of determining that the handoff back action to the target MSC (i.e., the anchor MSC 65) should occur may include the steps of sending a HandoffMeasurementRequest message 150 from the serving MSC 95 to the anchor MSC 65, which is followed by the step of sending a HandoffMeasurementRequest response 160 from the anchor MSC 65 to the serving MSC 95. The serving MSC 95 determines the target for a handoff based on measurements report by the anchor MSC 65. The step of verifying that the designated channel 107 of the anchor MSC 65 is available to support MS 50 and establishing an inter-MSC trunk 185 between the anchor MSC 65 and the serving MSC 95 may include the step of sending a FacilitiesDirective message 170 along the call path from the serving MSC 95 to the anchor MSC 65 to direct the anchor MSC 65 to initiate an intersystem handoff task, and the step of sending a FacilitiesDirective response 180 from the anchor MSC 65 to the service MSC 95 to verify the designated channel 107 is available to support the MS 50 and establish the inter-MSC trunk 185 between the anchor MSC 65 and the serving MSC 95. The step of moving the MS 50 to the designated channel 107 of the anchor MSC 65 may include the steps of sending a Mobile Handoff Order message 190 from the serving MSC 95 to the MS 50, receiving the MS 50 on the designated channel 107 at the arrival step 200, and sending a Mobile Station On Channel message 210 from the anchor MSC 65 to the serving MSC 95. Finally, the step of having the target/anchor MSC 65 direct the tandem1 MSC 75 and the serving MSC 95 to release the first, second, and third inter-MSC trunks 120, 130, and 185 may include the steps of sending a FacilitiesRelease message along the call path from the anchor MSC 65 to the serving MSC 95 (steps 220 and 230), sending a FacilitiesRelease message 240 along the call path from the serving MSC 95 to the anchor MSC 65, sending a FacilitiesRelease response 250 along the call path from the anchor MSC 65 to the serving MSC 95, and sending a FacilitiesRelease response along the call path from the serving MSC 95 to the anchor MSC 65 (steps 260 and 270).

At this point, the inter-MSC trunks 120, 130, and 185 have been released. The remaining connections within the network include the telephone line 110 and a wireless network interface 280. No unnecessary inter-MSC trunks remain connected along the call path between the telephone 40 and the MS 50.

Figure 6:
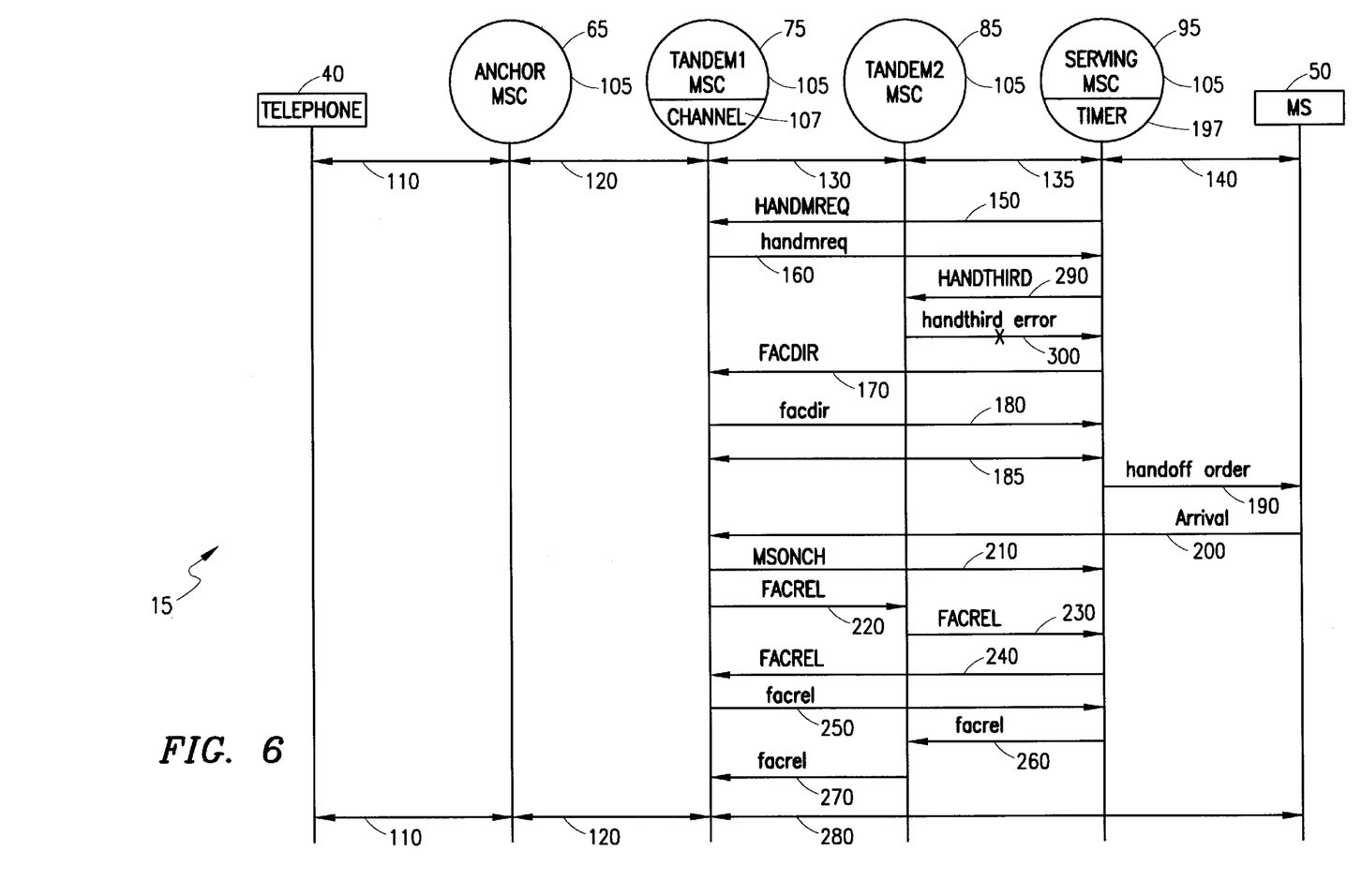
FIG. 6 is a network signaling and nodal operation diagram illustrating the method of the present invention where path minimization may be possible, but fails.

Turning now to FIG. 6, the second embodiment of the method of the present invention can be seen. In this case, a method of supporting a handoff back call connection operation within a telecommunications network using the FacilitiesDirective message with path minimization (and message support failure) is demonstrated. In this instance, the initial network 15 includes a telephone 40 (which may be a mobile phone or other telecommunications device) connected to an anchor MSC 65 using a telephone line 110 (or wireless network interface, etc. as appropriate to the telephonic device 40), and an MS 50 served by a serving MSC 95, over a wireless network interface 140, connected along the call path to a tandem2 MSC (TMSC2) 85, a tandem1 MSC (TMSC1) 75 and an anchor MSC 65. The anchor MSC 65 is connected to the TMSC1 75 by a first inter-MSC trunk 120, the TMSC1 75 is connected to the TMSC2 85 by a second inter-MSC trunk 130, and the TMSC2 85 is connected to the SMSC 95 by a third inter-MSC trunk 135. The TMSC1 75 includes a designated channel 107. However, the method in this case comprises the steps of determining that a handoff back call connection operation to a target MSC should occur, wherein the target MSC is the switch without a direct trunk connection to the serving MSC 95, such as tandem1 MSC 75, and determining that the tandem2 MSC 85 (in this exemplary case) will not support a path minimization operation. The next steps involve verifying that the designated channel 107 of the tandem1 MSC 75 is available to support the MS 50, establishing a fourth inter-MSC trunk 185 between the tandem1 MSC 75 and the serving MSC 95, moving the MS 50 to the designated channel 107 of the tandem1 MSC 75, and then directing the tandem2 MSC 85 and the serving MSC 95 to release the second, third, and fourth inter-MSC trunks 130, 135 and 185. Finally, the method may include the step of marking the second, third, and fourth inter-MSC trunks, 130, 135, and 185 as idle.

The step of determining that a handoff back call connection operation to the target MSC should occur may include the steps of sending a HandoffMeasurementRequest message 150 from the serving MSC 95 to the tandem1 MSC 75, and sending a HandoffMeasurementRequest response 160 from the tandem1 MSC 75 to the serving MSC 95. The step of determining that the tandem2 MSC 85 will not support a path minimization operation may include the steps of sending a HandoffToThird message 290 from the serving MSC 95 to the tandem2 MSC 85, directing the tandem2 MSC 85 to perform an intersystem handoff task with path minimization, and receiving a response 300 from the tandem2 MSC 85 at the serving MSC 95, such as RETURN ERROR, REJECT, or NO RESPONSE (i.e., no response is received at the serving MSC 95 within the timeout period of the switch 95 message reception timer 197). The step of verifying that the designated channel 107 of the tandem1 MSC 75 is available to support the MS 50 and establishing an inter-MSC trunk connection 185 between the tandem1 MSC 75 and the serving MSC 95 may include the steps of sending a FacilitiesDirective message 170 from the serving MSC 95 to the tandem1 MSC 75 to direct the tandem1 MSC 75 to initiate an intersystem handoff task, and the step of sending a FacilitiesDirective response 180 from the tandem1 MSC 75 to the serving MSC 95 to verify the designated channel 107 is available to support the MS 50 and establish the inter-MSC trunk 185 between the tandem1 MSC 75 and the serving MSC 95. The step of moving the MS 50 to the designated channel 107 of the anchor MSC 65 includes the steps of sending a Mobile Handoff Order message 190 from the serving MSC 95 to the MS 50, receiving the MS 50 on the designated channel 107 at arrival step 200, and sending a Mobile Station On Channel message 210 from the tandem1 MSC 75 to the serving MSC 95. Finally, the step of directing the tandem2 MSC 85 and the serving MSC 95 to release the second, third, and fourth inter-MSC trunks 130, 135 and 185 includes the steps of sending a FacilitiesRelease message along the call path from the tandem1 MSC 75 to the serving MSC 95 (steps 220 and 230) via the tandem2 MSC 85, sending a FacilitiesRelease message 240 along the call path from the serving MSC 95 to the tandem1 MSC 75, sending a FacilitiesRelease response 250 along the call path from the tandem1 MSC 75 to the serving MSC 95, and sending a FacilitiesRelease response along the call path from the serving MSC 95 to the tandem1 MSC 75 (steps 260 and 270) via the tandem2 MSC 85. At this point, the call path includes only the telephone line 110, the anchor MSC 65 connected to the TMSC1 75 by a trunk 120, and the wireless network interface 280 between the telephone 40 and the MS 50. No unnecessary inter-MSC trunks 130, 135, and 185 are left connected, and network resources are conserved.

Although the invention has been described with reference to specific embodiments, this description is not meant to be construed in a limited sense. The various modifications of the disclosed embodiments, as well as alternative embodiments of the invention, will become apparent to persons skilled in the art upon reference to the description of the invention. It is, therefore, contemplated that the appended claims will cover such modifications that fall within the scope of the invention, or their equivalents.

What is claimed is:

1. A method supporting a handoff back call connection operation within a telecommunications network including a Mobile Station (MS) served by a Serving Mobile Switching Center (SMSC) connected along a call path to a Tandem MSC (TMSC) and a Mobile Switching Center (MSC), wherein the MSC is connected to the TMSC by a first inter-MSC trunk and the TMSC is connected to the SMSC by a second inter-MSC trunk, wherein the MSC includes a designated channel, and wherein the handoff back call connection operation occurs from the SMSC to the MSC, comprising the steps of:

determining that the handoff back call connection operation to a Target MSC should occur, wherein the Target MSC is the MSC;

verifying that the designated channel of the MSC is available to support the MS and establishing a third inter-MSC trunk between the MSC and the SMSC;

moving the MS to the designated channel of the MSC; and sending a message along the call path from the MSC to the TMSC and the SMSC directing the TMSC and the SMSC to release the first, second, and third inter-MSC trunks.

2. The method of claim 1, wherein the step of determining that a handoff back action to the Target MSC should occur includes the steps of:

sending a HandoffMeasurementRequest message from the SMSC to the MSC; and sending a HandoffMeasurementRequest response from the MSC to the SMSC.

3. The method of claim 1, wherein the step of verifying that the designated channel of the MSC is available to support the MS and establishing the third inter-MSC trunk between the MSC and the SMSC includes the steps of:

sending a FacilitiesDirective message from the SMSC to the MSC to direct the MSC to initiate an intersystem handoff task; and sending a FacilitiesDirective response from the MSC to the SMSC to verify the designated channel is available to support the MS and establish the third inter-MSC trunk between the MSC and the SMSC.

4. The method of claim 1, wherein the step of moving the MS to the designated channel of the MSC includes the steps of:

sending a MobileHandoffOrder message from the SMSC to the MS;

receiving the MS on the designated channel; and sending a Mobile Station On Channel message from the MSC to the SMSC.

5. The method of claim 1, wherein the step of directing the TMSC and SMSC to release the first, second, and third inter-MSC trunks includes the steps of:

sending a FacilitiesRelease message along the call path from the MSC to the TMSC;

sending a FacilitiesRelease message along the call path from the TMSC to the SMSC;

sending a FacilitiesRelease message along the call path from the SMSC to the MSC;

sending a FacilitiesRelease response along the call path from the MSC to the SMSC;

sending a FacilitiesRelease response along the call path from the SMSC to the TMSC; and sending a FacilitiesRelease response along the call path from the TMSC to the MSC.

6. A method supporting a handoff back call connection operation within a telecommunications network including a Mobile Station (MS) served by a Serving Mobile Switching Center (SMSC) connected along a call path to a Tandem MSC (TMSC) and a Mobile Switching Center (MSC), wherein the MSC is connected to the TMSC by a first inter-MSC trunk and the TMSC is connected to the SMSC by a second inter-MSC trunk, wherein the MSC includes a designated channel, and wherein the handoff back call connection operation occurs from the Serving MSC to the Anchor MSC, comprising the steps of:

determining that the handoff back call connection operation to a Target MSC should occur, wherein the Target MSC is the MSC;

determining that the MSC will not support a path minimization operation;

verifying that the designated channel of the MSC is available to support the MS and establishing a third inter-MSC trunk between the MSC and the SMSC;

moving the MS to the designated channel of the MSC; and directing the TMSC and SMSC to release the first, second, and third inter-MSC trunks.

7. The method of claim 6, wherein the step of determining that a handoff back call connection operation to the Target MSC should occur includes the steps of:

sending a Handoff Measurement Request message from the SMSC to the MSC; and sending a Handoff Measurement Request response from the MSC to the SMSC.

8. The method of claim 6, wherein the step of determining that the MSC will not support a path minimization operation includes the steps of:

sending a HandoffToThird message from the SMSC to the TMSC directing the TMSC to perform an intersystem handoff task with path minimization; and receiving a response from the MSC at the SMSC selected from the group consisting of: NO RESPONSE, RETURN ERROR, or REJECT.

9. The method of claim 6, wherein the step of verifying that the designated channel of the MSC is available to support the MS and establishing a third inter-MSC trunk between the MSC and the SMSC includes the steps of:

sending a Facilities Directive message from the SMSC to the MSC to direct the MSC to initiate an intersystem handoff task; and sending a Facilities Directive response from the MSC to the SMSC to verify the designated channel is available to support the MS and establish the third inter-MSC trunk between the MSC and the SMSC.

10. The method of claim 6, wherein the step of moving the MS to the designated channel of the MSC includes the steps of:

sending a Mobile Handoff Order message from the SMSC to the MS;

receiving the MS on the designated channel; and sending a Mobile Station On Channel message from the MSC to the SMSC.

11. The method of claim 6, wherein the step of directing the TMSC and SMSC to release the first, second, and third inter-MSC trunks includes the steps of:

sending a Facilities Release message along the call path from the MSC to the TMSC;

sending a Facilities Release message along the call path from the TMSC to the SMSC;

sending a FacilitiesRelease message along the call path from the SMSC to the MSC;

sending a FacilitiesRelease response along the call path from the MSC to the SMSC;

sending a Facilities Release response along the call path from the SMSC to the TMSC; and sending a Facilities Release response along the call path from the TMSC to the MSC.

* * * * *

UNITED STATES PATENT AND TRADEMARK OFFICE
CERTIFICATE OF CORRECTION

PATENT NO.    : 6,442,388 B1                                                Page 1 of 1
DATED         : August 27, 2002
INVENTOR(S)   : Lopez et al.

It is certified that error appears in the above-identified patent and that said Letters Patent is hereby corrected as shown below:

Column 2,
Line 31, replace "MSG 70" with -- MSC 70 --

Column 3,
Line 54, replace " MSG 90" with -- MSC 90 --

Signed and Sealed this

Fourth Day of February, 2003

JAMES E. ROGAN
*Director of the United States Patent and Trademark Office*